United States Patent
Marya et al.

(10) Patent No.: US 9,783,732 B2
(45) Date of Patent: Oct. 10, 2017

(54) COMPOSITIONS AND METHODS FOR TREATING A SUBTERRANEAN FORMATION

(71) Applicant: SCHLUMBERGER TECHNOLOGY CORPORATION, Sugar Land, TX (US)

(72) Inventors: Manuel P. Marya, Sugar Land, TX (US); Hemant K. J. Ladva, Missouri City, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 60 days.

(21) Appl. No.: 14/567,647

(22) Filed: Dec. 11, 2014

(65) Prior Publication Data

US 2016/0168965 A1    Jun. 16, 2016

(51) Int. Cl.
    *C09K 8/80*     (2006.01)
    *E21B 43/26*    (2006.01)
    *E21B 43/267*   (2006.01)
    *C09K 8/502*    (2006.01)
    *C09K 8/504*    (2006.01)
    *C09K 8/516*    (2006.01)
    *C09K 8/72*     (2006.01)

(52) U.S. Cl.
    CPC .......... *C09K 8/805* (2013.01); *C09K 8/502* (2013.01); *C09K 8/5045* (2013.01); *C09K 8/516* (2013.01); *C09K 8/72* (2013.01); *E21B 43/267* (2013.01); *C09K 2208/08* (2013.01)

(58) Field of Classification Search
    CPC ........ E21B 43/26; E21B 43/267; E21B 43/16; E21B 33/138; E21B 43/04; C09K 8/805
    See application file for complete search history.

(56) References Cited

U.S. PATENT DOCUMENTS

| | | | |
|---|---|---|---|
| 3,064,572 A * | 11/1962 | Aitchison | F42B 3/087 102/313 |
| 7,919,183 B2 * | 4/2011 | McDaniel | C09K 3/1436 166/295 |
| 8,211,247 B2 * | 7/2012 | Marya | C09K 8/805 148/400 |
| 8,227,026 B2 * | 7/2012 | McDaniel | C09K 8/805 427/212 |
| 8,567,494 B2 * | 10/2013 | Rytlewski | C09K 8/68 166/192 |
| 8,663,401 B2 * | 3/2014 | Marya | C09K 8/805 148/400 |
| 8,744,329 B2 | 6/2014 | Yamada | |
| 2002/0048676 A1 * | 4/2002 | McDaniel | A63K 1/00 428/404 |
| 2006/0078682 A1 * | 4/2006 | McDaniel | C09K 3/1436 427/372.2 |
| 2007/0044958 A1 * | 3/2007 | Rytlewski | C09K 8/68 166/250.01 |
| 2007/0181224 A1 * | 8/2007 | Marya | C09K 8/805 148/400 |
| 2009/0044945 A1 | 2/2009 | Willberg et al. | |
| 2009/0238988 A1 * | 9/2009 | McDaniel | C09K 8/805 427/487 |
| 2010/0065273 A1 | 3/2010 | Sawdon et al. | |
| 2012/0080189 A1 * | 4/2012 | Marya | C09K 8/805 166/279 |
| 2012/0125618 A1 | 5/2012 | Willberg et al. | |
| 2012/0285692 A1 | 11/2012 | Potapenko et al. | |
| 2012/0318513 A1 | 12/2012 | Mazyar et al. | |
| 2013/0133897 A1 * | 5/2013 | Baihly | E21B 34/063 166/376 |
| 2013/0152824 A1 * | 6/2013 | Crews | C04B 28/006 106/641 |
| 2013/0168257 A1 * | 7/2013 | Mazyar | C09K 8/54 205/261 |
| 2013/0175037 A1 * | 7/2013 | Crews | C09K 8/572 166/305.1 |
| 2013/0209308 A1 | 8/2013 | Mazyar et al. | |
| 2014/0034320 A1 | 2/2014 | Ladva et al. | |
| 2014/0060834 A1 * | 3/2014 | Quintero | E21B 33/13 166/292 |
| 2014/0151046 A1 | 6/2014 | Marya et al. | |
| 2016/0230494 A1 * | 8/2016 | Fripp | E21B 33/134 |
| 2016/0230498 A1 * | 8/2016 | Walton | E21B 33/12 |
| 2016/0251934 A1 * | 9/2016 | Walton | E21B 33/12 166/376 |
| 2016/0273300 A1 * | 9/2016 | Walton | E21B 33/12 |
| 2016/0290083 A1 * | 10/2016 | Takahashi | E21B 33/12 |
| 2016/0298412 A1 * | 10/2016 | Fripp | E21B 33/12 |

* cited by examiner

*Primary Examiner* — Zakiya W Bates
*Assistant Examiner* — Crystal J Miller
(74) *Attorney, Agent, or Firm* — Andrea E. Tran

(57) ABSTRACT

A degradable composition including magnesium-based materials doped with metals, metalloids, and/or compounds, where the composition has a hardness in excess of 80 BHN, and methods of using the same (for example, as a constituent of a treatment fluid of a subterranean formation) are described. The degradable composition may be a shaped composition that degrades in environments typically encountered downhole, such as oilfield environments/conditions and/or fluids. Compositions including magnesium-based materials and various manufacturing processes to produce a composition including the magnesium-based materials in a desired shape are also described.

17 Claims, No Drawings

COMPOSITIONS AND METHODS FOR TREATING A SUBTERRANEAN FORMATION

BACKGROUND

Hydrocarbons (oil, natural gas, etc.) may be obtained from a subterranean geologic formation (a "reservoir") by drilling a well that penetrates the hydrocarbon-bearing formation. Well treatment methods often are used to increase hydrocarbon production by using a treatment fluid to interact with a subterranean formation in a manner that ultimately increases oil or gas flow from the formation to the wellbore for removal to the surface.

In numerous downhole operations and environments, it would be advantageous to be able to utilize a component comprised of a degradable composition in which the interaction with its fluidic environment and/or the decomposition of the degradable composition could be manipulated in a controlled manner.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some embodiments, the present disclosure relates to a method for treating a subterranean formation, including injecting, into a downhole environment, a fluid containing a composition comprising a magnesium-based material, the composition having a hardness in excess of 80 BHN, and a solvent, and subjecting the composition to a predetermined downhole condition that decomposes the composition, where the composition is in a form selected from the group consisting of a sphere, a particle, a bead, a pellet, a gravel, and an irregular shaped particle.

DETAILED DESCRIPTION

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

In accordance with the present disclosure, a degradable composition (having a predetermined hardness) comprising magnesium-based materials doped with metals (such as metals that result in a magnesium-based material that degrades and/or dissolves downhole), metalloids (such as metalloids that result in a magnesium-based material that degrades and/or dissolves downhole), and/or compounds (such as compounds that result in a magnesium-based material that degrades and/or dissolves downhole), and methods of using the same (for example, as a constituent of a treatment fluid of a subterranean formation) are described.

One method to measure hardness is by using the Brinell hardness test. Brinell hardness is determined by forcing a hard steel or carbide sphere of a specified diameter under a specified load into the surface of a material and measuring the diameter of the indentation left after the test. The Brinell hardness number, or simply the Brinell number or BHN, is obtained by dividing the load used, in kilograms, by the actual surface area of the indentation, in square millimeters. The result is a pressure measurement, but the units are generally not stated.

In embodiments, the degradable composition has a hardness, as measured by the Brinell hardness test, of at least about 80 BHN, such as from about 80 to about 400 BHN, or from about 100 to about 400 BHN. For example, the degradable composition may be in a form selected from the group consisting of a sphere, a particle, a bead, a pellet, a gravel, and an irregular shaped particle, where at least a portion (such as at least about 50% by weight, such as from about 50% by weight to about 100% by weight, or from about 60% by weight to about 99% by weight, relative to the total weight of the degradable composition) of the spheres, particles, beads, pellets, gravels, and/or irregular shaped particles, has a hardness of at least about 80 BHN, such as from about 80 to about 400 BHN, or from about 100 to about 400 BHN. In some embodiments, the degradable composition may be in a form selected from the group consisting of a sphere, a particle, a bead, a pellet, a gravel, and an irregular shaped particle, where each sphere, particle, bead, pellet, gravel, and irregular shaped particle in the degradable composition has a hardness of at least about 80 BHN, such as from about 80 to about 400 BHN, or from about 100 to about 400 BHN.

The compositions of the present disclosure comprising magnesium-based materials may be purposely doped in normally-undesirable metals, metalloids, and compounds to form (for example, a degradable component) having any desired size and/or shape, such as sub-centimeter size spheres, beads, pellets, flakes, and irregular shaped particles, optionally formed with an interior cavity that optionally may comprise a chemical entity, designed for a predetermined oilfield operation.

The terms "size" and "particle size" as used in the present disclosure (when referring, for example, to a sphere, bead, pellet, flake, and irregular shaped particle) refer to the diameter of the smallest imaginary circumscribed sphere that includes the shape. In some embodiments, the average size of the magnesium-based materials (such as a doped magnesium-based material) may be in a range of from about 10 µm to about 8500 µm, or an average size in a range of from about 100 µm to about 6500 µm, or an average size in a range of from about 1000 µm to about 5000 µm. In some embodiments, the size range of the individual magnesium-based materials that make up a plurality of individual magnesium-based materials may be in a range of from about 1 µm to about 20000 µm, or in a range of from about 100 µm to about 10000 µm, or an average size in a range of from about 1000 µm to about 4000 µm.

In some embodiments, the shaped composition is degradable in environments typically encountered downhole, such as oilfield environments/conditions and/or fluids. The present disclosure also describes compositions comprising magnesium-based materials and various manufacturing processes to produce a composition comprising the magnesium-based materials in a desired shape, where the degradable composition has a hardness, as measured by the Brinell hardness test, of at least about 80 BHN, such as from about 80 to about 400 BHN, or from about 100 to about 400 BHN.

As used herein, the term "composition" refers to a tangible element created by arranging several components, or sub-compositions, to form a unified whole, which thereby expands the definition of composition beyond a material chemical composition to include all shaped combinations of materials that may be used to achieve the purposes of the present disclosure. In some embodiments, the composition of the present disclosure comprises magnesium-based materials doped with metals, metalloids, and/or compounds, where the composition is manufactured in a desired form or shape, such as an article. Compositions comprising magnesium-based materials of the present disclosure doped in metals, metalloids, and/or compounds may be referred to as a "doped magnesium-based material" or simply "magnesium-based material", with these terms being used interchangeably throughout the present disclosure. Such compositions may be applied in a multitude of oilfield operations. The components (and proportions thereof) of the composition of the present disclosure may be adjusted to enhance or delay the interaction or rate of degradation of the composition with its environment, such as, for example, a fluidic environment that is corrosive to the composition.

As used herein, the terms "degrading", "degradable", "degrade", or "disintegrate" mean any instance in which the integrity of the composition is compromised (for example, due to the composition dissolving (partial or complete dissolution), and/or breaking apart into multiple pieces, and/or eroding by physical abrasion, chemical reactions, or a combination of physical abrasion and chemical reactions).

As used herein, the term "treatment fluid," refers to any pumpable and/or flowable fluid used in a subterranean operation in conjunction with a desired function and/or for desired purpose. Such treatment fluids may be modified to contain a composition comprising a doped magnesium-based materials, where the composition has a hardness, as measured by the Brinell hardness test, of at least about 80 BHN, such as from about 80 to about 400 BHN, or from about 100 to about 400 BHN (and optionally fibers comprising the doped magnesium-based materials). In some embodiments, the pumpable and/or flowable treatment fluid may have any suitable viscosity, such as a viscosity of from about 1 cP to about 10,000 cP (such as from about 10 cP to about 1000 cP, or from about 10 cP to about 100 cP) at the treating temperature, which may range from a surface temperature to a bottom-hole static (reservoir) temperature, such as from about 0° C. to about 150° C., or from about 10° C. to about 120° C., or from about 25° C. to about 100° C., and a shear rate (for the definition of shear rate reference is made to, for example, Introduction to Rheology, Barnes, H.; Hutton, J. F; Walters, K. Elsevier, 1989, the disclosure of which is herein incorporated by reference in its entirety) in a range of from about $1\ s^{-1}$ to about $100,000\ s^{-1}$, such as a shear rate in a range of from about $100\ s^{-1}$ to about $10,000\ s^{-1}$, or a shear rate in a range of from about $500\ s^{-1}$ to about $5,000\ s^{-1}$ as measured by common methods, such as those described in textbooks on rheology, including, for example, Rheology: Principles, Measurements and Applications, Macosko, C. W., VCH Publishers, Inc. 1994, the disclosure of which is herein incorporated by reference in its entirety. As used herein, the term "treating temperature," refers to the temperature of the treatment fluid that is observed while the treatment fluid is performing its desired function and/or desired purpose, such as fracturing a subterranean formation.

The term "treatment," or "treating," does not imply any particular action by the fluid. For example, a treatment fluid placed or introduced into a subterranean formation subsequent to a leading-edge fluid may be a hydraulic fracturing fluid, an acidizing fluid (acid fracturing, acid diverting fluid), a stimulation fluid, a sand control fluid, a completion fluid, a wellbore consolidation fluid, a remediation treatment fluid, a cementing fluid, a driller fluid, a frac-packing fluid, or gravel packing fluid. In the methods of the present disclosure, any one of the above fluids may be modified to include one or more compositions comprising a doped magnesium-based material of the present disclosure. The treatment fluids comprising a composition including doped magnesium-based materials of the present disclosure, may be used in full-scale operations, pills, slugs, or any combination thereof. As used herein, a "pill" or "slug" is a type of relatively small volume of specially prepared treatment fluid placed or circulated in the wellbore.

The term "fracturing" refers to the process and methods of breaking down a geological formation and creating a fracture, such as the rock formation around a wellbore, by pumping a treatment fluid at very high pressures (pressure above the determined closure pressure of the formation), in order to increase production rates from or injection rates into a hydrocarbon reservoir. The fracturing methods of the present disclosure may include a composition containing a doped magnesium-based material of the present disclosure in one or more of the treatment fluids, but otherwise use conventional techniques known in the art.

The composition of the present disclosure containing doped magnesium-based materials may be tailored such that the environment that is corrosive to the composition is one that is typically encountered downhole, such as, for example, an aqueous environment that includes formation water, seawater, salt (for example, brine), completion brine, stimulation treatment fluid, remedial cleanup treatment fluid, or an acidic or corrosive agent such as hydrogen sulfide, hydrochloric acid, or other such corrosive agents, or combinations thereof. The compositions comprising a doped magnesium-based material may degrade by eroding, abrading, dissolving or disintegrating, or any combination thereof when desirable for a particular downhole application. In some embodiments, the degradation of the composition comprising a doped magnesium-based material may proceed within minutes, hours, days or weeks depending upon the particular oilfield operation.

In embodiments, the composition of the present disclosure may be a composition (including a doped magnesium-based material) that will degrade and/or dissolve in a predetermined downhole oilfield environment, where the degradable composition has a hardness, as measured by the Brinell hardness test, of at least about 80 BHN, such as from about 80 to about 400 BHN, or from about 100 to about 400 BHN. The doped magnesium-based material of the composition may include magnesium in an amount of at least about 60% by weight, such as from about 65% by weight to about 90% by weight, or from about 70% by weight to about 80% by weight, relative to the total weight of the magnesium-based material; where from about 0.1% to about 10% by weight, such as from about 1% to about 9% by weight, or from about 2% to about 8% by weight, of the magnesium-based material may be composed of one or more of the following elements at the following amounts relative to the total weight of the magnesium-based material:

- at least about 0.02%, such as from about 0.02% to about 1.5%, or from about 0.05% to about 1%, by weight of a group VIIIB element (for example, Fe, Ru, Os, Co, Rh, Ir, Ni, Pd, and Pt) having less than 1% solubility in magnesium,
- at least about 0.02%, such as from about 0.02% to about 1.5%, or from about 0.05% to about 1%, by weight of a group VIB (for example, Cr, Mo, W, and Sg) or VIIB (for example, Mn, Tc, and Re) element having less than 1% solubility in magnesium,
- at least about 0.02%, such as from about 0.02% to about 1.5%, or from about 0.05% to about 1%, by weight of a group IIB (for example, Zn, Cd, and Hg), IVB (for example, (Ti, Zr, and Hf) or VB (for example, V, Nb, and Ta) element having less than 1% solubility in magnesium,
- at least about 0.02%, such as from about 0.02% to about 1.5%, or from about 0.05% to about 1%, by weight of a lanthanide (elements with atomic numbers 57 through 71) or actinide (elements with atomic numbers from 89 to 103) element having less than 1% solubility in magnesium,
- at least about 0.05%, such as from about 0.05% to about 1.5%, or from about 0.08% to about 1.2%, by weight of a group IB (Cu, Ag, and Au) or IIB (for example, Zn, Cd, and Hg) element having less than 1% solubility in magnesium, or
- at least about 0.05%, such as from about 0.05% to about 1.5%, or from about 0.08% to about 1.2%, by weight of a group IIA (for example, Be, Ca, Sr, Ba and Ra), IVA (for example, C, Si, Ge, Sn, and Pb), VA (for example, N, P, As, Sb, and Bi), VIA (for example, Cr, Mo, and W), metal or metalloid element having less than 1% solubility in magnesium.

Unless specified otherwise, the elemental percentages of the doped magnesium-based material of the present disclosure are weight percentages (wt %) relative to the total weight of the magnesium-based material and are assessed after formation of the material by suitable analytical methods (the solubility of the elements is also assessed in this manner), such as, for example, by spectroscopic, x-ray fluorescence, energy-dispersive X-ray spectroscopy, energy dispersive spectroscopy (EDS), electron backscatter diffraction (EBSD), wavelength dispersive spectrometry (WDS), and micro X-ray fluorescence (Micro-XRF), energy dispersive X-ray analysis (EDXA) and/or energy dispersive X-ray microanalysis (EDXMA).

For example, energy-dispersive X-ray spectroscopy (commonly referred to as EDS or EDX) may be employed for elemental analysis of the doped magnesium-based material. As known in the art, EDS is an analytical technique that can be used for chemical characterization (elemental analysis) of a sample. Briefly, in EDS, a doped magnesium-based material sample may be exposed to a high energy beam of charged particles (for example, electrons or protons). The incident beam can cause electronic excitation of various elements of the sample, for example, by exciting electrons from an inner shell to create a hole in that shell. An electron from an outer shell can then fill the hole and release X-ray energy equal to the energy difference between the two shells. The energy of the emitted X-ray depends on the energy difference between the two shells, which is a characteristic of a particular element. Thus, the energy spectrum of the emitted X-ray radiation can be analyzed to determine elemental composition of the doped magnesium-based material sample. Any suitable spectrometer may be employed for this analysis, such as one equipped with an EDAX EDS detector.

In some embodiments, the doped magnesium-based material may also include an amount of aluminum. Such a composition of the present disclosure may be a composition having a hardness, as measured by the Brinell hardness test, of at least about 80 BHN, such as from about 80 to about 400 BHN, or from about 100 to about 400 BHN, that will degrade in a predetermined downhole oilfield environment, and comprise a doped magnesium-based material including magnesium in an amount of at least about 50% by weight, such as from about 65% by weight to about 90% by weight, or from about 70% by weight to about 80% by weight, relative to the total weight of the magnesium-based material; aluminum in an amount up to about 50% by weight, such as from about 5% by weight to about 45% by weight, or from about 10% by weight to about 30% by weight, relative to the total weight of the magnesium-based material; where (in some embodiments, in addition to the amount of aluminum) from about 0.1% to about 10% by weight, such as from about 1% to about 9% by weight, or from about 2% to about 8% by weight, of the magnesium-based material is composed of one or more of the following additional elements (in addition to the above described elements) at the following amounts relative to the total weight of the magnesium-based material:

- at least about 0.02%, such as from about 0.02% to about 1.5%, or from about 0.05% to about 1%, by weight of a group VIIIB element (for example, Fe, Ru, Os, Co, Rh, Ir, Ni, Pd, and Pt) having less than 1% solubility in magnesium,
- at least about 0.02%, such as from about 0.02% to about 1.5%, or from about 0.05% to about 1%, by weight of a group VIB (for example, Cr, Mo, W, and Sg) or VIIB (for example, Mn, Tc, and Re) element having less than 1% solubility in magnesium, at least about 0.02%, such as from about 0.02% to about 1.5%, or from about 0.05% to about 1%, by weight of a group IIB (for example, Zn, Cd, and Hg), IVB (for example, (Ti, Zr, and Hf) or VB (for example, V, Nb, and Ta) element having less than 1% solubility in magnesium, at least about 0.02%, such as from about 0.02% to about 1.5%, or from about 0.05% to about 1%, by weight of a lanthanide (elements with atomic numbers 57 through 71) or actinide (elements with atomic numbers from 89 to 103) element having less than 1% solubility in magnesium, at least about 0.05%, such as from about 0.05% to about 1.5%, or from about 0.08% to about 1.2%, by weight of a group IB (Cu, Ag, and Au) or IIB (for example, Zn, Cd, and Hg) element having less than 1% solubility in magnesium, or at least about 0.05%, such as from about 0.05% to about 1.5%, or from about 0.08% to about 1.2%, by weight of a group IIA (for example, Be, Ca, Sr, Ba and Ra), IVA (for example, C, Si, Ge, Sn, and Pb), VA (for example, N, P, As, Sb, and Bi), VIA (for example, Cr, Mo, and W), metal or metalloid element having less than 1% solubility in magnesium.

In some embodiments, the doped magnesium-based material may also include an amount of Fe, Co, Ni, Ru, Rh, Pd, aluminum, lithium, sodium, potassium, calcium and/or a carbon material (or carbon source, such as, for example, coke, carbon char, charcoal, graphite, carbides, and/or carbon-containing polymers, such as rubber (synthetic or natural) and other synthetic and/or natural polymers). Such a composition of the present disclosure may be a composition having a hardness, as measured by the Brinell hardness test, of at least about 80 BHN, such as from about 80 to about 400 BHN, or from about 100 to about 400 BHN, that will degrade in a predetermined downhole oilfield environment, and comprise a doped magnesium-based material including magnesium in an amount of at least about 60% by weight, such as from about 65% by weight to about 90% by weight, or from about 70% by weight to about 80% by weight, relative to the total weight of the magnesium-based material; Fe, Co, Ni, Ru, Rh, Pd, aluminum, lithium, sodium, potassium, calcium and/or a carbon material (or carbon source) in an amount up to about 10% by weight, such as from about 1% to about 9% by weight, or from about 2% to about 8% by weight, relative to the total weight of the magnesium-based material; and/or calcium or carbon material in an amount up to about 10%, such as from about 1% to about 9% by weight, or from about 2% to about 8% by weight, by weight relative to the total weight of the magnesium-based material.

For example, a sphere, a particle, a bead, a pellet, a gravel, and an irregular shaped particle may be generated from the following components: Mg+(6)Al+(1)Zn+(1) carbon source (where the carbon source is either SiC or carbon nanotubes (CNT)), where Mg is the major component present in an amount as described above and the other components are present in the above molar rations to achieve a hardness of at least about 80 BHN, such as from about 80 to about 400 BHN, or from about 100 to about 400 BHN. In such embodiments, increasing to molar ratio of SiC or CNT may result in faster degradation of the composition and higher hardness, such as a hardness in a range of from about 100 to about 400 BHN.

In some embodiments, the more elements (that are very different from Mg) added to Mg, the higher the rate of degradation. For example, incorporation of transition metals or any other metals in amounts outside the above ranges may induce cracking if the added metal(s) are metallurgically incompatible at the added amount.

In some embodiments, the compositions of the present disclosure manufactured from the doped magnesium-based material of the present disclosure may possess any desired morphology and or combinations of multiple morphologies. For example, the degradable compositions having a hardness, as measured by the Brinell hardness test, of at least about 80 BHN, such as from about 80 to about 400 BHN, or from about 100 to about 400 BHN, manufactured from the doped magnesium-based material of the present disclosure may have a crystalline, amorphous, mixed crystalline or amorphous structure.

In some embodiments, the microscopic structure of the doped magnesium-based material may be dendritic, cellular, and or columnar. In some embodiments where the solubility for a given element is exceeded, for example, simply because of the presence of additional elements, additional phases may form in the composition of the present disclosure. These additional phases may be located between the doped magnesium-based material grains. In some embodiments, these additional phases may appear in the composition of the present disclosure as spherical, needle-like or plate-like materials dispersed within the grains of the doped magnesium-based material.

In some embodiments, the materials of the doped magnesium-based material may be selected such that a decomposition initiating temperature is in the range of from about −40° C. to about 400° C., or in the range of from about 0° C. to about 300° C., such as in the range of from about 40° C. to about 180° C. In some embodiments, prior to exposure to a predetermined degradation condition, the composition comprising a doped magnesium-based material may have not been exposed to a condition or temperature that would initiate degradation.

In some embodiments, compositions comprising magnesium-based materials may be alloys prepared, for example, by gas-fired, electrical or induction melting processes, optionally with atmospheric protection and overpressures to ensure minimal vaporization losses. Such alloys may be prepared from commercial alloys, where, for example, the alloying and/or doping elements may be introduced in the form of pure metals until the desired proportions are obtained. In some embodiments, commercial alloys and the alloying and/or doping elements may be melted, magnetically and/or mechanically stirred in a single refractory crucible. Such melts may be subsequently poured into appropriately dimensioned stainless steel or ceramic molds, resulting in solid ingots of a desired size. The alloy ingots may be examined (by the above-mentioned analytical techniques and/or metallographically) to ensure the desired proportions of components are present in the formed doped magnesium-based material. In some embodiments, the furnace may be maintained at any suitable temperature, such as temperatures in the range of from about 650° C. to about 750° C., for example, to ensure a rapid melting of the alloying elements in addition to minimizing evaporation losses of volatile metals, such as magnesium. In some embodiments, the temperature employed may depend on the melting point alloying elements. For example, when employing a higher-melting point alloying elements, higher temperatures may be used, optionally in conjunction with overpressures (pressurized melting). Gaseous argon may also be used in order to minimize the oxidation of the alloying elements at elevated temperatures and maintain a consistency in the appearance of the cast ingots. The ingots may be solidified and cooled at ambient temperature in their stainless steel molds.

In some embodiments, non-reactive dopants may be added as powder into a melt. Such materials may be provided as a powder having a particle size of from about 5 nanometers (nm) to about 5000 µm, or about 100 µm to about 5000 µm. In some embodiments, particles of the powder may be coated using any suitable method, such as chemical vapor deposition, physical vapor deposition, wet chemical deposition, electrochemical deposition, electroless deposition, or admixed by physical method such cryomilling, ball milling, for example, with a metal or mixture of metals such as Al, Ca, Mg, Mn, Zn, Zr, Mo, Si, Re, Ni, W, Co, Cu, Fe, or oxides, carbides, nitrides of one of these metals, or a combination of any of the aforementioned materials.

In some embodiments, the manufacturing process may include melting a magnesium-based material of the present disclosure, and forming droplets by pressurized jet in optionally a fine powder-contaminating environment for the purpose of alloying.

In some embodiments, compositions comprising a magnesium-based material may comprise a combination of normally insoluble metal or alloys with metallurgically-soluble (partially/wholly) and/or blendable elements selected from other metals or alloys, semi-metallic elements, and/or non-metallic elements. Such materials may be used to form compositions including complex alloys and composite structures of poor stability in the designated fluid environment of the oilfield treatment operation. Examples of such metals, semi-metallic elements, and non-metallic elements that may be combined with the at least about 60% by weight magnesium (relative to the total weight of the magnesium-based material) include any metal, semi-metallic element, or non-metallic element that will form a non-durable (degradable) composition with the magnesium. Examples include metals such as gallium, indium, tin, antimony, combinations of these; semi-metallic elements such as carboxylated carbon (e.g. in graphitic or nanotube form), and organic compounds such as sulfonated polystyrene, styrene sulfonic acid, and compositions comprising non-metallic materials such as oxides (anhydride), carbonates, sulfides, chlorides, bromides, acid-producing or basic producing polymers, or in general fluid pH changing polymers.

In some embodiments, non-metallic materials may be included in a composition comprising a magnesium-based material of the present disclosure. Non-metallic materials may include, for example, carbon materials (or carbon sources, such as, for example, coke, carbon char, charcoal, graphite, carbides, and/or carbon-containing polymers, such as rubber (synthetic or natural) and other synthetic and/or natural polymers), alkaline and alkaline-earth oxides, sulfides, chlorides, bromides, and the like. These materials, alone, may be at least partially water-soluble and, when combined (for example, blended) with normally insoluble metals and alloys, may degrade the chemical resistance of the normally insoluble metals by changing the designated fluid chemistry, including its corrosiveness, thus creating galvanic cells, among other possible mechanisms of degradations (for example, galvanic corrosion and lower pH created by acid-polymers, or indirectly by promoting ionic compounds such as hydroxides, known to predictably dissolve in the designated fluid environment). In some embodiments, the compositions may include materials that bring about exothermic reactions in a fluid, such as water, that may act as a trigger to the degradation of the composition of the present disclosure.

The ratio of insoluble metal to metallurgically soluble or blendable elements may be dependent on the end use of the composition, the pressure, temperature, and composition lifetime duration, as well as the fluid environment compositions, and, for example, may range from about 0.1% to about 30% by weight based on the total weight of the composition, or from about 1% to about 20% by weight based on the total weight of the composition.

Other degradable materials that may be included in the compositions of the present disclosure include those described in U.S. Pat. Nos. 8,211,247, and 8,567,494, the disclosures of which are incorporated by reference in their entirety herein.

In some embodiments, the compositions comprising magnesium-based materials may be used in manufacturing processes to produce articles and/or compositions of any desired shape or size that have a hardness, as measured by the Brinell hardness test, of at least about 80 BHN, such as from about 80 to about 400 BHN, or from about 100 to about 400 BHN. Such shapes may be sub-centimeter sized spheres, beads, pellets, fibers, flakes, irregular shaped particles (each of which may be optionally be formed with an interior cavity) having enhanced environmental degradability in oilfield conditions and fluids. The compositions of the present disclosure may be formed into any desirable shape by known methods.

For example, the compositions comprising a magnesium-based material of the present disclosure may be used in a process including stamping a solid or hollow wire/rod feed through a die (also optionally shearing) to form a desired sphere, bead, or any other desirable shape, which, if formed with a cavity, may optionally be loaded with a chemical entity.

For example, shaped compositions having a cavity may be formed form compositions comprising a magnesium-based material, where the cavity may be loaded with any desired chemical entity to form a "loaded magnesium-based material". The size of the cavity may depend on the desired characteristics of the magnesium-based material, such as, for example the crush strength and the ability of the doped alloy to deform. In some embodiments, where the magnesium-based material is in the shape of a component having a cavity, the cavity may be less than 50% of the volume of the component, such as in a range of from less than 50% of the volume of the component to more than 2% of the volume of the component, or in a range of from less than 30% of the volume of the component to more than 10% of the volume of the component.

The term "chemical entity" refers, for example, to one or more atoms, molecules, and/or ions that may be used in a subterranean operation in conjunction with carrying out desired application and/or for achieving a desired function. For example, chemical entities may include acids, bases, explosives, crosslinkers, breakers, and/or other chemicals.

In embodiments, the magnesium-based materials formed with a cavity (when loaded with a chemical entity) may act as a vehicle that temporarily stores and/or chemically isolates the chemical entity while it is being transported to a treatment zone or a subterranean formation, where it may diffuse and/or be released from the magnesium-based materials, such as after a predetermined period of time or after exposure to a predetermined downhole condition and/or predetermined downhole environment (such as for example, the surrounding chemicals and the phase thereof, including pH, ionic strength, temperature, pressure, etc.) that degrades and/or dissolves the magnesium-based materials. After the chemical entity is released from the loaded magnesium-based material it is then available for its intended, reaction, function and/or application, for example, as a crosslinker, a breaker, or an acidizing agent.

The temporary storage and/or chemical isolation of the chemical entity in the loaded magnesium-based material prevents the premature reaction and/or use of the chemical entity for a predetermined period of time, such as before reaching the treatment zone or subterranean formation, and/or before the loaded magnesium-based material is exposed to a predetermined downhole condition (such as, for example, temperature) and/or predetermined downhole environment (such as, for example, the surrounding chemicals and the phase thereof, including pH, ionic strength, temperature, pressure, etc.), which may result in the loaded magnesium-based material degrading and releasing the chemical entity.

In embodiments where the composition comprising a magnesium-based material of the present disclosure contains explosives, such explosive components may include any suitable explosive, such as, for example, a chemical that is sensitive to a predetermined downhole condition or environment, such as a water-sensitive chemical that would violently react with water, or those chemicals described in, for example, U.S. Pat. No. 3,064,572, the disclosure of which is herein incorporated by reference in its entirety.

The treatment fluids of the present disclosure comprising compositions including doped magnesium-based materials of the present disclosure may be introduced into a wellbore during methods that may be applied at any time in the life cycle of a reservoir, field or oilfield. For example, the methods and treatment fluids of the present disclosure may be employed in any desired downhole application (such as, for example, fracturing or stimulation) at any time in the life cycle of a reservoir, field or oilfield.

The methods of the present disclosure that comprise fracturing or stimulation of a subterranean formation may include a composition containing the doped magnesium-based material that may partially or completely dissolve, or break apart into multiple pieces (upon exposure to a predetermined condition) in one or more of the treatment fluids, but otherwise use conventional fracturing techniques known in the art.

A "wellbore" may be any type of well, including, a producing well, a non-producing well, an injection well, a fluid disposal well, an experimental well, an exploratory deep well, and the like. Wellbores may be vertical, horizontal, deviated some angle between vertical and horizontal, and combinations thereof, for example a vertical well with a non-vertical component.

The term "field" includes land-based (surface and sub-surface) and sub-seabed applications. The term "oilfield," as used herein, includes hydrocarbon oil and gas reservoirs, and formations or portions of formations where hydrocarbon oil and gas are expected but may additionally contain other materials such as water, brine, or some other composition.

In embodiments, the doped magnesium-based material (and optionally fibers formed therefrom), shape, size, thickness (diameter), density and/or concentration may be selected to be any suitable value that is effective to perform the intended downhole operation, such as downhole plugging to close fracture and activate adjacent fracture in anticipation for augmented production, a gravel-packing type application to create temporary filter-cakes for sand control, drilling operations (including pumping the spheres, beads and gravels composed of the composition of the present disclosure containing a doped magnesium-based material within a treatment/carrier fluid of a predetermined viscosity to facilitate placement downhole, preventing and/or inhibiting particulate material flowback, or to function as a proppant.

In embodiments, any desired additional particulate material, including a doped magnesium-based particulate material, may be used in the methods of the present disclosure, provided that it is compatible with the formation, the fluid, and the desired results of the treatment operation. For example, particulate materials may include sized sand, synthetic inorganic proppants, coated proppants, uncoated proppants, resin coated proppants, and resin coated sand.

In embodiments where the particulate material is a proppant (such as a proppant comprising the doped magnesium-based materials of the present disclosure, optionally in combination with one or more conventional proppants), the proppant used in the methods of the present disclosure may be any appropriate size to prop open the fracture and allow fluid to flow through the proppant pack, that is, in between and around the proppant making up the pack. In some embodiments, the proppant may be selected based on desired characteristics, such as size range, crush strength, and insolubility. In embodiments, the proppant may have a sufficient compressive or crush resistance to prop the fracture open without being deformed or crushed by the closure stress of the fracture in the subterranean formation. In embodiments, the proppant may not dissolve in treatment fluids commonly encountered in a well.

Any additional proppant may also be used, provided that it is compatible with the doped magnesium-based materials of the present disclosure, the formation, the fluid, and the desired results of the treatment operation. Such proppants may be natural or synthetic (including silicon dioxide, sand, nut hulls, walnut shells, bauxites, sintered bauxites, glass, natural materials, plastic beads, particulate metals, drill cuttings, ceramic materials, and any combination thereof), coated, or contain chemicals; more than one may be used sequentially or in mixtures of different sizes or different materials. The proppant may be resin coated, provided that the resin and any other chemicals in the coating are compatible with the other chemicals of the present disclosure, such as the thermally shrinkable and/or shrunken fibers of the present disclosure.

The proppant (such as a proppant comprising the doped magnesium-based material of the present disclosure) used in the methods of the present disclosure may have an average particle size of from about 0.15 mm to about 2.39 mm (about 8 to about 100 U.S. mesh), or of from about 0.25 to about 0.43 mm (40/60 mesh), or of from about 0.43 to about 0.84 mm (20/40 mesh), or of from about 0.84 to about 1.19 mm (16/20), or of from about 0.84 to about 1.68 mm (12/20 mesh) and or of from about 0.84 to about 2.39 mm (8/20 mesh) sized materials. The proppant may be present in a slurry (which may be added to the treatment fluid) in a concentration of from about 0.12 to about 3 kg/L, or about 0.12 to about 1.44 kg/L (about 1 PPA to about 25 PPA, or from about 1 to about 12 PPA; PPA is "pounds proppant added" per gallon of liquid).

In some embodiments, a composition comprising a magnesium-based material of the present disclosure may be coated with a material that will delay the contact between an environment capable of corroding the composition of the present disclosure, such as an aqueous environment, and the degradable portion of the composition of the present disclose. The terms "coated" or "coating", as described herein may refer to encapsulation or simply to changing the surface by chemical reaction or by forming or adding a thin film of another material. In some embodiments, a coated composition comprising a magnesium-based material of the present disclosure may slow the initiation of the degradation of the composition comprising a magnesium-based material of the present disclosure.

In some embodiments, the composition comprising a magnesium-based material of the present disclosure, such as a composition comprising a magnesium-based material of the present disclosure in a selected form, such as a particle, may have a core surrounded by a coating, where the core comprises the magnesium-based material and the coating includes a layer of material not identical to the magnesium-based material. For example, the coating may be any suitable material, such as a metallic layer, an organic layer, a calcium phosphate-containing layer, a fluoride-containing layer, and/or an inorganic layer.

In some embodiments, a composition comprising a magnesium-based material of the present disclosure may be distributed in a polymeric material, and/or coated in a polymeric material, to form a composite composition comprising a magnesium-based material of the present disclosure, which may be incorporated into a treatment fluid and pumped into a subterranean formation. For example, such a composite composition comprising a magnesium-based material of the present disclosure may be used to further delay the contact of a corrosive agent or environment with the composition comprising the magnesium-based material and thus prolong the existence of the composition comprising a magnesium-based material of the present disclosure. Because the corrosive agent will diffuse into the polymeric material, the amount of degradation delay can be increased by increasing the size of the additional polymer layer that coats the composition comprising a magnesium-based material of the present disclosure. The size of the layer will depend on the specific application for which the composition comprising a magnesium-based material of the present disclosure is intended.

A degradable composition having a hardness, as measured by the Brinell hardness test, of at least about 80 BHN, such as from about 80 to about 400 BHN, or from about 100 to about 400 BHN, comprising a magnesium-based material of the present disclosure may optionally be coated with any known material that can be dissolved, degraded, or disintegrated (and/or erode by physical abrasion, chemical etching, or a combination of physical abrasion and chemical etching) within a desirable period of time at a selected temperature in a selected fluid, such as hydrocarbons, treatment fluid, water, water-based drilling fluids, hydrocarbon-based drilling fluids, or a specific solution. Eroding includes partially or completely removing the coating. Partial removal of the coating during erosion, such as by wearing away patches, or strips, and/or scratches in the coating, which removes a portion of the surface of the coating and exposes the underlying magnesium-based material, is in some embodiments sufficient to allow penetration of a corrosive agent to degrade the magnesium-based material. Such physical abrasion may also be induced by interaction with some other treatment fluid component, such as a proppant. Abrasion may also be accomplished by other mechanical means, such as, for example, by insertion of a downhole tool or element and moving a tool or element with or against the coating to scratch or abrade the coating.

Suitable coating materials may include synthetic or natural materials that can dissolve in hydrocarbons, such as plastics, polymers, or elastomers. Examples of polymers may include polyolefin (such as polyethylene) polymers, paraffin waxes, polyalkylene oxides (such as polyethylene oxides), and polyalkylene glycols (such as polyethylene glycols). Other suitable coating materials may be metals or alloys that can dissolve in a specific solvent or treatment fluid. Examples of metals or alloys that may be used to coat the composition comprising a magnesium-based material of the present disclosure may include zinc, titanium, aluminum, or alloys of these metals, which are dissolvable or degradable by acidic or neutral aqueous solutions or water.

Suitable coating materials may also include biodegradable polymers, for example, polylactide ("PLA"), polyglycolic acid ("PGA"); polycaprolactams and mixtures of PLA and PGA; solid acids, such as sulfamic acid, trichloroacetic acid, and citric acid, held together with a wax or other suitable binder material.

The rate at which the coating of the composition comprising a magnesium-based material of the present disclosure may degrade may be dependent on multiple factors, such as the types of the materials, the types of the fluids, the environmental factors (pressure and temperatures). For polymers, the molecular weights of the polymers may affect their dissolution rates. Acceptable dissolution rates for polymers used to coat the composition comprising a magnesium-based material of the present disclosure, for example, may be achieved with a molecular weight in a range of about 100,000 to about 7,0000,000 Daltons, such as about 100,000 to about 1,0000,000 Daltons.

The coating materials may dissolve, degrade, or disintegrate (and/or erode by physical abrasion, chemical etching, or a combination of physical abrasion and chemical etching) over any desired period of time, such as a period of time ranging from about 1 hour to about 480 hours, such as from about 1 to about 48 hours, or from about 1 to about 24 hours, and over a temperature range from about 50° C. to 250° C., such as from about 100° C. to about 250° C., or from about 150 to about 250° C. Additionally, a treatment fluid, water or some other chemicals may be used alone or in combination to dissolve the coating materials. Other fluids that may be used to dissolve the coating materials include alcohols, mutual solvents, and fuel oils such as diesel.

The methods of the present disclosure may include providing doped magnesium-based fibers (and particulate doped magnesium-based material) during a treatment operation of a subterranean formation. For example, a plug or porous solid pack (including particulate doped magnesium-based materials and/or doped magnesium-based fibers) may be formed that comprises the composition of the present disclosure.

In some embodiments, an additional fibrous material may also be included in the treatment fluid. The fiber thickness (diameter), density and concentration may be any suitable value that is effective to assist in the oilfield operation. The fiber may be one or more member selected from natural fibers, synthetic organic fibers, glass fibers, ceramic fibers, carbon fibers, inorganic fibers, metal fibers, a coated form of any of the above fibers, that either have no thermal shrinkability, or have thermal shrinkability.

In some embodiments, the composition of the present disclosure comprising a doped magnesium-based material may be in the form of a fiber (hereinafter referred to as a "doped magnesium-based fiber"), such as by forming cutting a wire of the doped magnesium-based material, or passing the doped magnesium-based material thru a die at high velocity such that it may deform. In some embodiments, the composition of the present disclosure comprising a doped magnesium-based material may be in the form of a fiber having a predetermined length (such as greater than 4 mm, such as a fiber length in the range of from about 4 mm to about 30 mm, or in the range of from about 5 mm to about 20 mm) and concentration (such as a concentration in the range of from about 0.5 to about 10% by weight of, for example, the treatment fluid or a specific treatment fluid component, such as, proppant (which also may be made from doped magnesium-based materials), or a concentration in the range of from about 1 to about 4% by weight, or a concentration in the range of from about 1 to about 2% by weight) that is selected to allow the fibers to effectively perform their intended downhole function before degrading.

In some embodiments, the doped magnesium-based fiber may have any desired length, such as a doped magnesium-based fiber length in the range of from about 4 mm to about 50 mm, or in the range of from about 4 mm to about 20 mm, or in the range of from about 6 mm to about 10 mm. In some embodiments, the treatment fluid may comprise doped magnesium-based fibers having any desired average length, such as a doped magnesium-based fiber average length in the range of from about 4 mm to about 20 mm, or in the range of from about 4 mm to about 10 mm, or in the range of from about 6 mm to about 8 mm.

In some embodiments, the doped magnesium-based fibers may have an average thickness (diameter) in the range of from about 5 µm to about 100 µm, such as in the range of from about 15 µm to about 40 µm, or in the range of from about 17 µm to about 35 µm.

The doped magnesium-based fibers may have an aspect ratio in the range of from about 200 to about 3000, or in the range of from about 200 to about 1000. The doped magnesium-based fibers may have an aspect ratio in the range of from about 300 to about 1000, or in the range of from about 300 to about 700. As used herein, the "aspect ratio" of a fiber is defined as the ratio of its length (that is, its longest dimension) to its diameter (that is, its shortest dimension).

In some embodiments, the doped magnesium-based fibers and/or particulate doped magnesium-based material may have an average density in the range of from about 1.2 g/cm$^3$ to about 3.6 g/cm$^3$, such as in the range of from about 1.7 g/cm$^3$ to about 2.6 g/cm$^3$, or in the range of from about 1.9 g/cm$^3$ to about 2.3 g/cm$^3$. In some embodiments, the doped magnesium-based fibers and/or particulate doped magnesium-based material may be selected such that the density thereof matches that of an additional particulate material, such as proppants, employed; or the doped magnesium-based fibers and/or particulate doped magnesium-based material may be selected to have an average density that is within ±2% of the average density of the additional particulate materials, such as proppants, employed.

In embodiments, the fiber (such as a doped magnesium-based fiber) used in the methods of the present disclosure may be straight. In some embodiments, the fiber (such as a doped magnesium-based fiber) used in the methods of the present disclosure may be a fiber that is curved, crimped, or spiral-shaped. In some embodiments, the fiber (such as a doped magnesium-based fiber) used in the methods of the present disclosure may be hooked on one or both ends.

In some embodiments, the fiber (such as a doped magnesium-based fiber) used in the methods of the present disclosure may be of a composite structure. For example, more than one material may make up the monofilament fiber, the sheath of a bi-component fiber with a core/sheath coaxial structure, or the sheath of a bi-component fiber with a core/sheath coaxial structure.

In embodiments, the outermost surface of the doped magnesium-based fiber may be an amorphous polymer capable of degrading upon exposure to a predetermined condition. Suitable amorphous polymers that capable of degrading upon exposure to a predetermined temperature that can be used in the methods of the present disclosure may include, for example, polylactic acids.

The doped magnesium-based fiber may be present in the treatment fluid in any amount that is effective to perform the desired oilfield operation. In some embodiments, the doped magnesium-based fibers are present in the treatment fluid in an amount in the range of from about 0.3 to about 2.5% by weight of the treatment fluid, or in the range of from about 0.4 to about 1.8% by weight of the treatment fluid.

The treatment fluid capable of degrading and/or carrying the composition containing the doped magnesium-based material may be any well treatment fluid, such as a fluid loss control pill, a water control treatment fluid, a scale inhibition treatment fluid, a fracturing fluid, a gravel packing fluid, a drilling fluid, and a drill-in fluid. The carrier solvent for the treatment fluid may be a pure solvent or a mixture. Suitable solvents for use with the methods of the present disclosure, such as for forming the treatment fluids disclosed herein, may be aqueous or organic based. Aqueous solvents may include at least one of fresh water, sea water, brine, mixtures of water and water-soluble organic compounds and mixtures thereof. Organic solvents may include any organic solvent that is able to dissolve or suspend the various components, such as the chemical entities and/or components of the treatment fluid.

Suitable organic solvents may include, for example, alcohols, glycols, esters, ketones, nitrites, amides, amines, cyclic ethers, glycol ethers, acetone, acetonitrile, 1-butanol, 2-butanol, 2-butanone, t-butyl alcohol, cyclohexane, diethyl ether, diethylene glycol, diethylene glycol dimethyl ether, 1,2-dimethoxy-ethane (DME), dimethylether, dibutylether, dimethyl sulfoxide (DMSO), dioxane, ethanol, ethyl acetate, ethylene glycol, glycerin, heptanes, hexamethylphosphorous triamide (HMPT), hexane, methanol, methyl t-butyl ether (MTBE), N-methyl-2-pyrrolidinone (NMP), nitromethane, pentane, petroleum ether (ligroine), 1-propanol, 2-propanol, pyridine, tetrahydrofuran (THF), toluene, triethyl amine, o-xylene, m-xylene, p-xylene, ethylene glycol monobutyl ether, polyglycol ethers, pyrrolidones, N-(alkyl or cycloalkyl)-2-pyrrolidones, N-alkyl piperidones, N,N-dialkyl alkanolamides, N,N,N',N'-tetra alkyl ureas, dialkylsulfoxides, pyridines, hexaalkylphosphoric triamides, 1,3-dimethyl-2-imidazolidinone, nitroalkanes, nitro-compounds of aromatic hydrocarbons, sulfolanes, butyrolactones, alkylene carbonates, alkyl carbonates, N-(alkyl or cycloalkyl)-2-pyrrolidones, pyridine and alkylpyridines, diethylether, dimethoxyethane, methyl formate, ethyl formate, methyl propionate, acetonitrile, benzonitrile, dimethylformamide, N-methylpyrrolidone, ethylene carbonate, dimethyl carbonate, propylene carbonate, diethyl carbonate, ethylmethyl carbonate, dibutyl carbonate, lactones, nitromethane, nitrobenzene sulfones, tetrahydrofuran, dioxane, dioxolane, methyltetrahydrofuran, dimethylsulfone, tetramethylene sulfone, diesel oil, kerosene, paraffinic oil, crude oil, liquefied petroleum gas (LPG), mineral oil, biodiesel, vegetable oil, animal oil, aromatic petroleum cuts, terpenes, mixtures thereof.

While the treatment fluids of the present disclosure are described herein as comprising the above-mentioned components, it should be understood that the treatment fluids of the present disclosure may optionally comprise other chemically different materials. In embodiments, the treatment fluid may further comprise stabilizing agents, surfactants, diverting agents, or other additives. Additionally, a treatment fluid may comprise a mixture of various crosslinking agents, and/or other additives, such as fibers or fillers, provided that the other components chosen for the mixture are compatible with the intended use of the treatment fluid. Furthermore, the treatment fluid may comprise buffers, pH control agents, and various other additives added to promote the stability or the functionality of the treatment fluid. The components of the treatment fluid may be selected such that they may or may not react with the subterranean formation that is to be treated.

In this regard, the treatment fluid may include components independently selected from any solids, liquids, gases, and combinations thereof, such as slurries, gas-saturated or non-gas-saturated liquids, mixtures of two or more miscible or immiscible liquids, and the like, as long as such additional components allow for the desired degradation of the composition containing a doped magnesium-based material of the present disclosure. For example, the treatment fluid may comprise organic chemicals, inorganic chemicals, and any combinations thereof. Organic chemicals may be monomeric, oligomeric, polymeric, crosslinked, and combinations, while polymers may be thermoplastic, thermosetting, moisture setting, elastomeric, and the like. Inorganic chemicals may be metals, alkaline and alkaline earth chemicals, minerals, and the like.

In embodiments, the treatment fluid may be driven into a wellbore by a pumping system that pumps one or more treatment fluids into the wellbore. The pumping systems may include mixing or combining devices, wherein various components, such as fluids, solids, and/or gases maybe mixed or combined prior to being pumped into the wellbore. The mixing or combining device may be controlled in a number of ways, including, but not limited to, using data obtained either downhole from the wellbore, surface data, or some combination thereof.

Fracturing a subterranean formation may include introducing hundreds of thousands of gallons of treatment fluid, such as a fracturing fluid, into the wellbore. In some embodiments a frac pump may be used for hydraulic fracturing. A frac pump is a high-pressure, high-volume pump, such as a positive-displacement reciprocating pump. In embodiments, a treatment fluid comprising the composition containing the doped magnesium-based material may be introduced by using a frac pump, such that the treatment fluid (such as a fracturing fluid) may be pumped down into the wellbore at high rates and pressures, for example, at a flow rate in excess of about 20 barrels per minute (about 4,200 U.S. gallons per minute) at a pressure in excess of about 2,500 pounds per square inch ("psi"). In some embodiments, the pump rate and pressure of the treatment fluid (such as a fracturing fluid) may be even higher, for example, at flow rates in excess of about 100 barrels per minute and pressures in excess of about 10,000 psi may be used.

The foregoing is further illustrated by reference to the following examples, which are presented for purposes of illustration and are not intended to limit the scope of the present disclosure.

EXAMPLE

Particles were generated with 9% aluminium, 1% iron, 3% potassium chloride and the balance magnesium. The particles were generated with a growth rate of greater than 0.1 mm/day. The particles including 1% iron formed hard intermetallic phases resulting in a hardness of greater than 80 BHN. Similar results were obtained with iron was replaced by other transition-metal elements.

Although the preceding description has been described herein with reference to particular means, materials and embodiments, it is not intended to be limited to the particulars disclosed herein; rather, it extends to all functionally equivalent structures, methods and uses, such as are within the scope of the appended claims. Furthermore, although only a few example embodiments have been described in detail above, those skilled in the art will readily appreciate that many modifications are possible in the example embodiments without materially departing from the disclosure of COMPOSITIONS AND METHODS FOR TREATING A SUBTERRANEAN FORMATION. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method for treating a subterranean formation, comprising:
    injecting, into a downhole environment, a fluid comprising:
        a composition comprising a magnesium-based material, the composition having a hardness in excess of 80 Brinell hardness number;
            wherein the magnesium-based material comprises from about 65% by weight to about 90% by weight magnesium relative to a total weight of the magnesium-based material; and
            wherein a total of from 0.1% to 10% by weight of the magnesium-based material includes one or more of:
                0.02% by weight to 1.5% by weight of a group VIIIB, a group VIB, a group VIIB, a group IVB, a group VB, a lanthanide, an actinide, Cd, or Hg element having less than 1% solubility in magnesium, or
                0.05% by weight to 1.5% by weight of a group IB, a group IVA, a group VIA, Be, Sr, Ba, Ra, N, P, As, or Sb metal or metalloid element having less than 1% solubility in magnesium, relative to the total weight of the magnesium-based material; and
        a solvent; and
    subjecting the composition to a predetermined downhole condition that decomposes the composition; wherein the composition is in a form selected from a group consisting of a sphere, a particle, a bead, a pellet, a gravel, and an irregular shaped particle.

2. The method of claim 1, wherein the composition further comprises a carbon source in an amount up to about 10% by weight relative to the total weight of the magnesium-based material.

3. The method of claim 1, wherein the composition further comprises K, or Na in an amount up to about 10% by weight relative to the total weight of the magnesium-based material.

4. The method of claim 1, wherein the composition is amorphous, semi-amorphous, or semi-crystalline.

5. The method of claim 1, wherein the composition comprises a bimodal distribution of particle sizes.

6. The method of claim 1, the predetermined downhole oilfield environment is an aqueous fluid.

7. The method of claim 1, wherein the composition is comprised in either a plug that closes a fracture, or a temporary filter-cake in a sand control operation.

8. The method of claim 1, wherein the composition is a particle having a cavity.

9. The method of claim 8, wherein the cavity is loaded with one or more chemical entities.

10. The method of claim 9, wherein the one or more chemical entities are selected from a group consisting of acids and explosive substances.

11. The method of claim 1, wherein the composition is a particle having a core surrounded by a coating, where the core comprises the magnesium-based material and the coating includes a layer of material not identical to the magnesium-based material.

12. The method of claim 11, wherein the coating is selected from a group consisting of a metallic layer, an organic layer, a calcium phosphate-containing layer, a fluoride-containing layer, and an inorganic layer.

13. The method of claim 11, further comprising eroding the coating of the composition by physical abrasion, chemical etching, or a combination of physical abrasion and chemical etching, before decomposing the composition in the predetermined downhole environment.

14. The method of claim 1, wherein the composition is a particle distribution having a number average particle size of from about 100 μm to about 6500 μm.

15. The method of claim 1, wherein the fluid further comprises fibers.

16. The method of claim 15, wherein the fibers are made of the same material as the composition.

17. A method for treating a subterranean formation, comprising:
    injecting, into a downhole environment, a fluid comprising:
        a composition comprising a magnesium-based material, the composition having a hardness in excess of 80 Brinell hardness number;
    wherein the magnesium-based material comprises from about 50% by weight to about 90% by weight magnesium relative to a total weight of the magnesium-based material,
    wherein the magnesium-based material comprises from about 5% by weight to about 45% by weight aluminum relative to a total weight of the magnesium-based material, and
    wherein a total of from 0.1% to 10% by weight of the magnesium-based material
    includes one or more of:
        0.02% by weight to 1.5% by weight of a group VIIIB, a group VIB, a group VIIB, a group IVB, a group VB, a lanthanide, an actinide, Cd, or Hg element having less than 1% solubility in magnesium, or
        0.05% by weight to 1.5% by weight of a group IB, a group IVA, a group VIA, Be, Sr, Ba, Ra, N, P, As, or Sb metal or metalloid element having less than 1% solubility in magnesium, relative to the total weight of the magnesium-based material; and
    a solvent; and
    subjecting the composition to a predetermined downhole condition that decomposes the composition; wherein the composition is in a form selected from a group consisting of a sphere, a particle, a bead, a pellet, a gravel, and an irregular shaped particle.

* * * * *